United States Patent [19]

Secen et al.

[11] Patent Number: 5,382,878
[45] Date of Patent: Jan. 17, 1995

[54] AUTO-STARTING SYSTEM FOR AN ELECTRODELESS HIGH INTENSITY DISCHARGE LAMP

[75] Inventors: Michael M. Secen, Mentor; Edward J. Thomas, Streetsboro, both of Ohio; Sayed-Amr A. El-Hamamsy, Schenectady, N.Y.

[73] Assignee: General Electric Company, Schenectady, N.Y.

[21] Appl. No.: 996,272

[22] Filed: Dec. 24, 1992

[51] Int. Cl.6 .................... H05B 41/24; H05B 41/36
[52] U.S. Cl. .................................. 315/248; 315/151; 315/158; 315/307; 315/308; 315/360; 315/DIG. 7
[58] Field of Search ............... 315/82, 236, 248, 267, 315/344, 157, 158, 291, 307, 308, 360, DIG. 2, DIG. 5, DIG. 7

[56] References Cited

U.S. PATENT DOCUMENTS

| | | | |
|---|---|---|---|
| 4,656,397 | 4/1987 | Chappell et al. | 315/241 |
| 4,763,044 | 8/1988 | Nuckolls et al. | 315/176 |
| 4,894,591 | 1/1990 | Witting | 315/248 |
| 5,004,955 | 4/1991 | Nilssen | 315/119 |
| 5,019,751 | 5/1991 | Flory, IV et al. | 315/290 |
| 5,047,692 | 9/1991 | Borowiec et al. | 315/248 |
| 5,068,578 | 11/1991 | Wegener | 315/307 |
| 5,103,143 | 4/1992 | Daub | 315/308 |
| 5,118,997 | 6/1992 | El-Hamamsy | 315/248 |
| 5,134,345 | 7/1992 | El-Hamamsy et al. | 315/248 |

*Primary Examiner*—David Mis
*Attorney, Agent, or Firm*—George E. Hawranko; Stanley C. Corwin

[57] ABSTRACT

An auto-starting lamp system comprises an electrodeless high intensity discharge lamp of the type including an arc tube that contains an ionizable fill, an excitation coil surrounding the arc tube for exciting an arc discharge in the ionizable fill at least during steady state lamp operation, and a starter circuit for facilitating arc discharge of the ionizable fill. The system further comprises a controllable r.f. power source for powering the lamp excitation coil, and an electrical network for matching the impedance of the excitation coil to the impedance of the r.f. power source. The impedance-matching network has the same impedance-matching relation during both lamp start-up and steady state lamp operation. A system controller causes the r.f. power source, during lamp start-up, to ramp up in power to a peak level preferably substantially in excess of a steady state lamp operating power level, and then to decrease from the peak level. Preferably, the system further comprises circuitry for re-powering the starter circuit after a predetermined period of time has elapsed that is sufficiently long as to prevent thermal damage to the lamp resulting from powering the starter circuit. The system preferably further comprises control circuitry for alternately turning on and turning off power to the starter circuit after the lamp ionizable fill recovers an ability to reach full arc discharge after being extinguished.

23 Claims, 5 Drawing Sheets

Fig. 2

Fig. 3A — CASE 1 - LAMP START

Fig. 3B — CASE 2 - NO START

AUTO-STARTING SYSTEM FOR AN ELECTRODELESS HIGH INTENSITY DISCHARGE LAMP

FIELD OF THE INVENTION

The present invention relates to a system for automatically starting a high intensity discharge lamp of the type that is powered from an excitation coil proximate a main arc tube of the lamp.

BACKGROUND OF THE INVENTION

High intensity discharge (HID) lamps contain an ionizable fill, or discharge plasma, that emits visible radiation when the fill is sufficiently excited; such excitation typically results from passage of electrical current through the fill. Typical fills include a medium to high pressure ionizable gas, such as mercury or sodium vapor. The present invention is directed to a class of HID lamps comprising electrodeless lamps that induce an arc discharge in a high pressure gaseous fill by generating a solenoidal electric field in the fill. The lamp fill is excited by radio frequency (r.f.) current in an excitation coil proximate a main arc tube.

Difficulties have arisen in achieving a full, or steady state, discharge in HID lamps of the foregoing type, i.e. those powered from an excitation coil proximate a main arc tube. One reason is that, at room temperature, the solenoidal excitation produced by the excitation coil is typically too weak to ionize the lamp fill and initiate arc discharge. Prior art approaches to this difficulty include the provision of starting aids that directly or capacitively couple high voltage to the main arc tube. The voltage gradient created in the main arc tube ionizes the lamp fill in progressive stages, from a relatively low current glow discharge, to a relatively high current, high intensity solenoidal arc discharge.

A typical prior art starting aid that directly couples high voltage to the main arc tube is disclosed in U.S. Pat. No. 5,047,693 of V. D. Roberts et al., issued Sep. 10, 1991; and a typical prior art starting aid that capacitively couples high voltage to the main arc tube is disclosed in U.S. Pat. No. 5,140,227 of J. T. Dakin et al., issued on Aug. 18, 1992. The foregoing patents are assigned to the instant assignee and hereby incorporated by reference.

While such starting aids have improved the starting ability of HID lamps of the mentioned type, other difficulties in starting such lamps are still typically encountered. For instance, lamp starting typically requires repeated tuning of a network for matching the impedance between the lamp excitation coil and its r.f. power source. Such impedance-matching network is tuned for the period of starting so as to achieve substantially full power transfer to the excitation coil. Once the lamp has reached full, or steady state, arc discharge, the impedance of the lamp excitation coil changes, requiring the impedance-matching network to be re-tuned to again achieve substantially full power transfer to the coil. Such tuning and re-tuning, moreover, is often a delicate procedure not readily susceptible to reliable automation.

It would thus be desirable to provide a system for automatically starting an HID lamp of the mentioned type that overcomes the need for the often-delicate tuning and re-tuning of an impedance-matching network to start and operate a lamp.

A further difficulty results in attempting to restart a lamp after being extinguished from steady state operation. A lamp may be extinguished accidentally, for instance, if a momentary disconnection of the lamp from its power supply circuit occurs. It has been found that the lamp typically cannot be re-started until it thermally recovers, i.e. cools below a critical level necessary for restarting to occur. For a 300-watt lamp, for instance, the thermal recovery period is typically on the order of 10 minutes, depending, however, upon the ambient thermal environment and construction of the lamp.

It would thus be desirable to provide a system for automatically starting an HID lamp of the mentioned type that overcomes the difficulty faced in re-starting a lamp after being extinguished from steady state operation.

It would further be desirable to provide an auto-starting system for a lamp of the mentioned type including the feature of turning off power to the lamp if an overload condition is sensed and further, one in which power supplied to the lamp is regulated to be within a narrow range.

SUMMARY OF THE INVENTION

Accordingly, an object of the present invention is to provide a system for automatically starting a high intensity discharge lamp of the type powered from an excitation coil proximate a main arc tube of the lamp and particularly one that is effective to re-start a lamp after its arc has been extinguished from steady state operation.

Yet another object is to provide an auto-starting system of the mentioned type that turns off power to the lamp if an overload condition is sensed and in which power supplied to the lamp is regulated to be within a narrow range.

Briefly stated, the invention in one form provides an auto-starting lamp system comprising an electrodeless high intensity discharge lamp of the type including an arc tube that contains an ionizable fill, an excitation coil surrounding the arc tube for exciting an arc discharge in the ionizable fill at least during steady state lamp operation, and a starter circuit for facilitating arc discharge of the ionizable fill. The system further comprises a controllable r.f. power source for powering the lamp excitation coil, and an electrical network for matching the impedance of the excitation coil to the impedance of the r.f. power source. The impedance-matching network has the same impedance-matching relation during both lamp start-up and steady state lamp operation. Control means are included in the system for causing the r.f. power source, during lamp start-up, to ramp up in power to a peak level in excess of a steady state lamp operating power level, and then to decrease from the peak level. Such peak level is preferably substantially in excess of a steady state power level.

In a preferred form, the auto-starting lamp system further comprises means for re-powering the starter circuit after a predetermined period of time has elapsed that is sufficiently long as to prevent thermal damage to the lamp resulting from powering the starter circuit.

Further, the system further can include control means for alternately turning on and turning off the power to the starter circuit after the lamp ionizable fill recovers an ability to reach full arc discharge after being extinguished.

In yet another preferred form, the auto-starting lamp system of the invention includes a gas probe in the lamp for helping to initiate arc discharge of the lamp ionizable fill, and an electron-yielding circuit for charging the gas probe with free electrons prior to powering the starter circuit.

Moreover, the system further comprises means for turning off the power to the starter circuit and the r.f. power source if the lamp ionizable fill has failed to reach arc discharge within a predetermined period of time.

Also, preferably, the auto-starting system further comprises an overload shut-down means for turning off the power to the lamp excitation coil if an overload condition is sensed as well as a power-adjusting means for adjusting the level of volt-amps sent from the r.f. power source to the lamp excitation coil so as to maintain a relatively steady level of power in the coil.

The above-described objects and further advantages of the invention will become apparent from the following description taken together with the accompanying drawings.

DETAILED DESCRIPTION OF THE PREFERRED EMBODIMENTS

Figure 1:
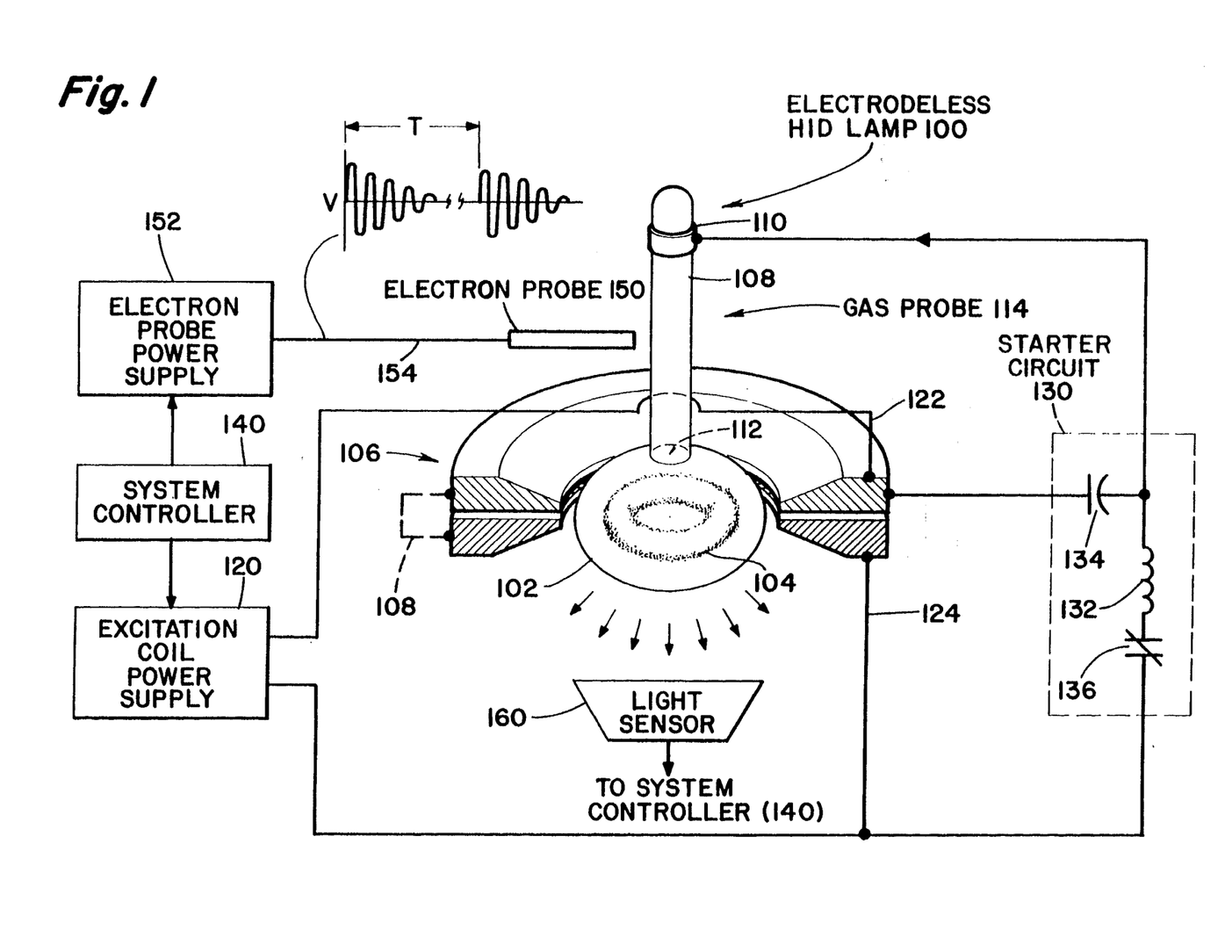
FIG. 1, which is partially in block diagram form, shows an electrodeless high intensity discharge (HID) lamp of the type powered from a coil, and further shows associated circuitry of an auto-starting system for such lamp.

FIG. 1 shows an electrodeless high intensity discharge (HID) lamp 100 and associated circuitry of the present system for automatically starting the lamp. Lamp 100 includes a main arc tube 102 in which an arc discharge 104 is generated by means of an excitation coil 106, shown partially cut away. Arc discharge 104 has the shape of a toroid, e.g. like a ring. Coil 106 comprises a coil with two turns, for instance, with the above- and lower-shown coil portions connected as schematically shown at 108. As shown, coil 106 has the overall shape of a volume formed by rotating a bilaterally symmetrical trapezoid about a coil center line situated in the same plane as the trapezoid, but which does not intersect the trapezoid. Further details of, and alternatives for, coil shape are set forth in U.S. Pat. No. 5,084,654 of S. A. El-Hamamsy and V. D. Roberts, issued on Jan. 28, 1992. Such patent is assigned to the instant assignee, and its disclosure is hereby incorporated by reference. Lamp coil 106 is supplied with r.f. power by a excitation coil power supply 120 connected to the coil with conductors 122 and 124.

Toroidal arc 104 is generated within a fill, or discharge plasma, contained within main arc tube 102 through interaction with excitation coil 106. Coil 106 essentially acts as the primary winding of an electrical transformer, with arc discharge 104 being the single-turn secondary winding of such transformer. Thus, radio frequency (r.f.) current in the excitation coil produces a time-varying magnetic field, in turn creating an electric field in the discharge plasma that closes completely upon itself so as to form a solenoidal electric field. Current flowing as a result of such solenoidal electric field causes toroidal arc discharge 104 in arc tube 102.

The fill within main arc tube 102 may comprise, for instance, a sodium halide, a cerium halide, and xenon combined in weight proportions to generate visible radiation exhibiting high efficacy and good color-rendering capability at white color temperatures. Another suitable fill comprises a combination of a lanthanum halide, a sodium halide, a cerium halide and xenon or krypton as a buffer gas. Further details of foregoing fills are mentioned in U.S. Pat. No. 5,084,654 of S. A. El-Hamamsy and V. D. Roberts, mentioned above; and also in any one of U.S. Pat. No. 4,810,938 of P. D. Johnson, J. T. Dakin and J. M. Anderson, issued on Mar. 7, 1989; and U.S. Pat. No. 4,972,120 of H. L. Witting, issued Nov. 20, 1990. The newly mentioned patents are assigned to the instant assignee, and their entire disclosures are hereby incorporated by reference.

HID lamp 100 further includes a hollow stem 108 containing a fill, or discharge plasma, and is separated from main arc tube 102, for instance, by a quartz window 112. A typical fill within hollow stem 108 is krypton. Collectively, stem 108 and its fill are referred to in the art as a gas probe, generally indicated in FIG. 1 by reference numeral 114. Gas probe 114 helps start main arc discharge 104 upon receiving electrical energy from a starter circuit 130 via a capacitively coupled sleeve 110. Further details of a gas probe are mentioned in above-cited U.S. Pat. No. 5,140,227 of J. T. Dakin et al., which is incorporated by reference.

As will be described below in more detail, gas probe 114 is temporarily energized by starter circuit 130 during a start-up timing sequence having a duration, for example, of about 1 second. In the embodiment shown, starter circuit 130 receives its power from excitation coil power supply 120, which, as mentioned above, supplies r.f. power to lamp coil 106. Starter circuit 130 includes a coil 132 coupled by a capacitive connection, or coupling, 134 to power supply conductor 122. Starter circuit 130 is energized when a solenoid-actuated starter switch 136 is closed so as to connect starter coil 132 to power supply conductor 124. As will be further explained below, starter switch 136 is responsive to system controller 140.

The inventive auto-starting lamp system works, not only with the above-described type of starter circuit 130 that is capacitively coupled by conductive sleeve 110 to lamp stem 108, but with HID lamps in general that utilize a starter circuit for initiating an auxiliary arc discharge in the vicinity of a main arc tube 102. Further, the present auto-starting lamp system works with starter circuits having a power supply separate from excitation coil power supply 120; in such case, the separately powered starter circuit is preferably tuned to a frequency different from that of excitation coil power supply 120, to avoid interference between the power circuits and prevent circulating currents from flowing through gas probe 114 during steady state operation of the lamp.

Where starter circuit 130 draws its power from excitation coil power supply 120, as shown in FIG. 1, it has been found desirable by the present inventors to provide a source of free electrons for the discharge plasma within lamp stem 108 shortly before energizing the starter circuit. The free electrons facilitate the initial breakdown, or arc discharge, in the discharge plasma in gas probe 114 and adjacent arc tube 102. Free electrons, for instance, may be provided by placing a conductive electron probe 150, such as copper, in the proximity of lamp stem 108, and applying a high voltage in excess of 5 kilovolts to the electron probe. Such high voltage may comprise a pulsed-and-damped a.c. voltage V such as shown in FIG. 1 in connection with conductor 154 that leads to electron probe 150. Voltage V may be produced in known manner per se by means (not shown) including, for instance, an electrical transformer, a pulse generator and an amplifier. The first full wave of voltage V is typically 20 kilovolts in amplitude with a frequency of about 2.0 megahertz; and the period T for repeating the damped oscillating voltage V is typically about 10 milliseconds. Considerable variations of the foregoing values will occur to those of ordinary skill in the art.

In addition to the mentioned transformer means for producing free electrons, a variety of alternative means will occur to those of ordinary skill in the art. Such alternative means may include piezoelectric or other electromechanical means, or induction devices other than transformers. Further alternative means for providing free electrons include generating free electrons with a source of ionizing radiation, such as an alpha source, with an X-ray source, or with a source of ultraviolet radiation.

FIG. 1 further shows a light sensor 160 for providing a sensing signal to system controller 140. Light sensor 160 detects when a steady state arc discharge 104 has been achieved within main arc tube 102. Sensor 160 may be embodied as a known photodetector, such as a photo transistor.

Figure 2:
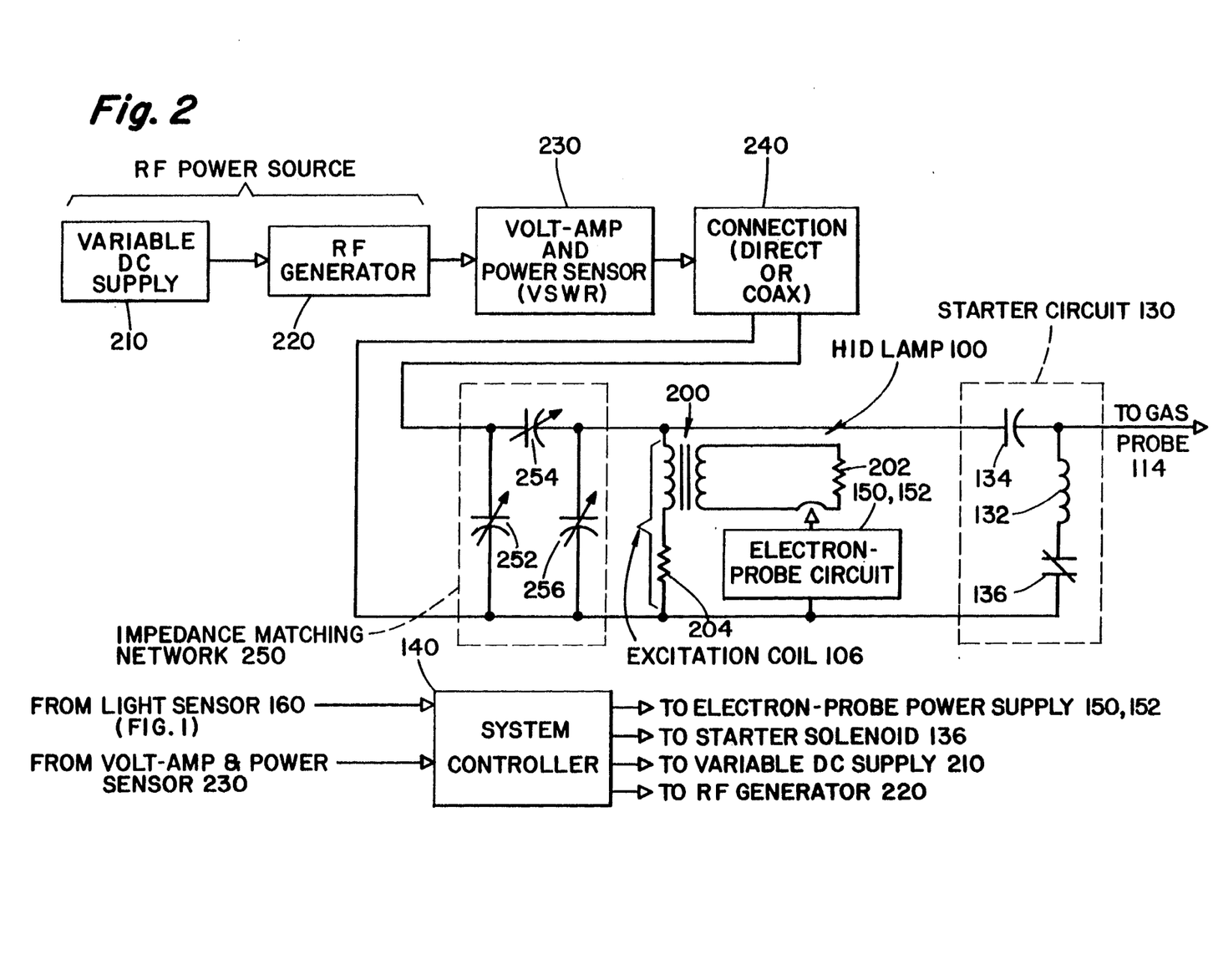
FIG. 2 shows most of the circuit of FIG. 1 in more detail, depicting the HID lamp by its equivalent electrical circuit.

Turning now to FIG. 2, most of the circuit of FIG. 1 is shown, but in more detail. HID lamp 100 in FIG. 2 is depicted as, in essence, the secondary winding of a transformer, whose main winding is excitation coil 106, together with an internal resistance 202. Excitation coil 106 is similarly shown with an internal resistance 204. Also shown in FIG. 2 are starter circuit 130, and diagrammatically depicted electron-probe circuit 150, 152.

The circuitry to the left of excitation coil 106 in FIG. 2 implements excitation coil power supply 120 of FIG. 1. As already mentioned, such power supply also powers starter circuit 130 in the illustrated embodiment.

A variable source of d.c. voltage 210 cooperates with an r.f. generator 220 to provide r.f. power for excitation coil 106 and starter circuit 130. In known manner, the level of voltage produced by variable d.c. supply 210 controls the level of power produced from r.f. generator 220. Typically r.f. generator 220 will provide r.f. energy at a frequency of 13.56 megahertz, which in the United States is an r.f. band with minimal restrictions for producing r.f. energy. It is known as the industrial-scientific-medical frequency band.

For various purposes mentioned below, the circuit of FIG. 2 includes a volt-amp & power sensor 230 to sense both the volt-amps sent to the circuitry to its right in the figure, and the power sent to such circuitry. In known manner, the power mathematically varies as the cosine of the phase angle between the volts and amps. Volt-amp & power sensor 230 may also be used to measure the voltage standing wave ratio (VSWR) of power sent to the circuitry to its right, as discussed below, to provide an alternative signal to the volts and amps sent to the right. Further details of sensor 230 are described below.

Sensor 230 and r.f. power source 210, 220 are connected to excitation coil 106 through a connection 240, either direct or a coaxial cable (or other transmission line) and an impedance-matching network 250. Network 250 may comprise, by way of example only, tunable capacitors 252, 254 and 256 interconnected in the manner shown. Impedance-matching network 250 assures that excitation coil 106 receives substantially all the power sent from r.f. power source 210, 220 during steady state operation. If the impedance setting of network 250 were to significantly deviate from an optimum setting, a r.f. power source 210, 220 would provide significant magnitudes of volts and amps substantially out of phase with each other. This would result in diminished power received by the load and reflection of significant r.f. power back to the power source, which could overheat and damage such source.

In what is believed a departure from prior art practice, impedance-matching network 250 is tuned only for the condition of matching, during steady state lamp operation, r.f. power source 210, 220 to the load (then, excitation coil 106). This achieves a nearly substantially complete power transfer from r.f. source 210, 220 to excitation coil 106 during steady state lamp operation. Such impedance-matching relation for steady state operation is maintained even during starting of HID lamp 100. In typical prior art practice, in contrast, the tunable elements of an impedance-matching network were tuned to match an r.f. power source with its load during starting, which assured that a starting circuit received sufficient power to effect lamp starting. Then, impedance-matching network was re-tuned to achieve matching for steady state lamp operation.

The present invention does not exclude re-tuning of impedance-matching circuit 250 for steady state operation, due to long-term drift of lamp impedance or of the impedance-matching relation of impedance-matching circuit 250.

In order to accommodate the power mismatch during lamp starting, system controller 140 causes r.f. power source 210, 220 to ramp up its power output during lamp starting, to a peak level typically exceeding about 40 percent of its steady state power output. With brief reference to FIG. 3A, the ramping of power from r.f. power source 210, 220 is shown as ramp 342 that leads to a peak level 344, which exceeds the steady state (S.S.) output level that follows. Providing such high level of ramped power during lamp starting has been discovered by the present inventors to provide sufficient power to start a HID lamp by overcoming the mismatched impedance condition of impedance-matching network 250.

As shown in FIG. 2, system controller 140 receives information from light sensor 160 (FIG. 1) and from volt-amp & power sensor 230. In turn, system controller 140 provides control signals for electron-probe power supply 150, 152, starter relay 136, variable d.c. supply 210 and r.f. generator 220.

SYSTEM-CONTROLLER FUNCTIONS

Figure 3A:
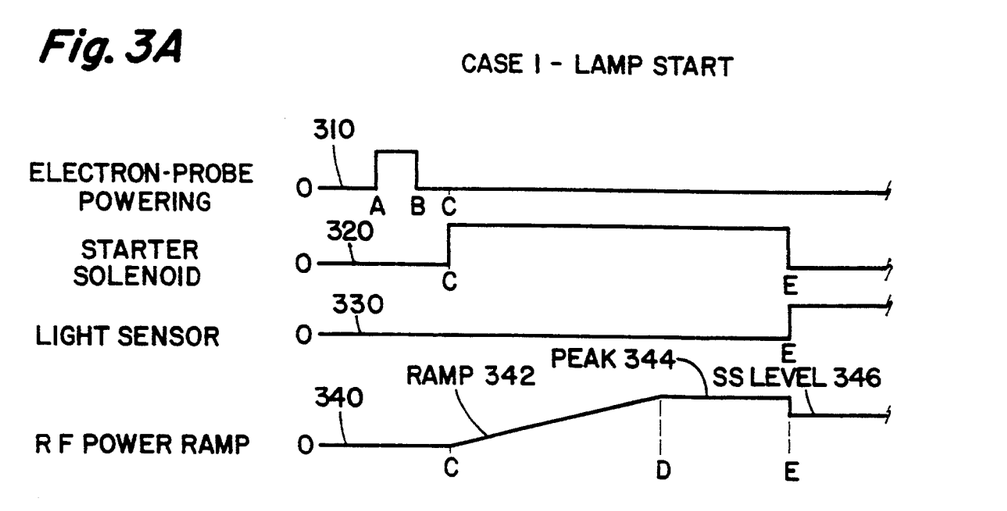
FIG. 3A shows starting-sequence timing waveforms used in the auto-starting system of FIGS. 1 and 2 in which a lamp start occurs.

The functions implemented by system controller 140 are further described in connection with FIGS. 3A–3B and 4–6. FIG. 3A illustrates "Case 1" in which a lamp start is achieved. Curve 310 shows the timing for powering electron probe 150, 152. The electron probe is powered from time A until time B, for a duration of typically 100 milliseconds. As mentioned above, the electron probe provides free electrons for gas probe 114 (FIG. 1) of HID lamp 100 where the starter circuit for the gas probe derived its power from the excitation coil power supply. Controller 140 then waits until time C before closing solenoid-actuated starter switch 136 at time C. The wait between times B and C prevents a plasma arc from occurring in the vicinity of lamp 100 due to a high energy ionizing electric field in the presence of a large number of free electrons near electron probe 150.

Meanwhile, light sensor 160 (FIG. 1) senses the absence of steady state operating light from HID lamp 100. At time C, system controller 140 causes variable d.c. supply 210 to ramp up its voltage output to r.f. generator 220, so as to create power ramp 342 reaching peak level 344 that substantially exceeds steady state (S.S.) level 346, as mentioned above. Power ramp 342 is suitably continuous and linear. For an HID lamp 100 of 300 watts power, for instance, system controller 140 causes r.f. power source 210, 220 to create a ramp 342 that typically reaches a peak 344 of 450 watts at time D, which occurs about 500 milliseconds after the ramp starts at time C.

At time E, curve 330 indicates that steady state light output from HID lamp 100 is detected. When this occurs, starter circuit 130 tends to supply a markedly increased level of power to gas probe 114. To avoid thermal damage to gas probe window 112, for instance, controller 140 responsively opens starter switch 136, to turn off the power to starter circuit 130. Preferably also at time E, controller 140 instructs variable d.c. supply 210 to lower its voltage output level so that r.f. power source 210, 220 outputs the reduced steady state power level 346 shown in curve 340. This limits potentially damaging heat build up in r.f. generator 220.

Figure 3B:
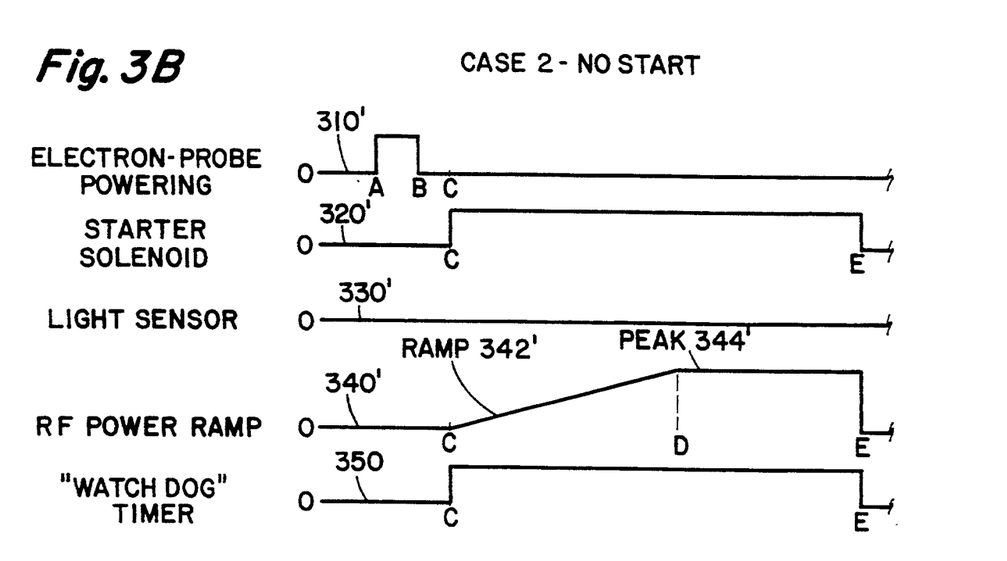
FIG. 3B shows starting-sequence timing waveforms similar to those of FIG. 3A except being for the case of a lamp start not occurring.

Turning now to FIG. 3B, "Case 2," in which a lamp start does not occur, is illustrated. FIG. 3B shows curves 310', 320', 330' and 340', corresponding to the like-numbered curves in FIG. 3A discussed above. Curves 310'–340' are identical to the corresponding curves 310–340 in FIG. 3A up through at least time D. As shown by curve 330', however, no steady state operating light output is detected by light sensor 160 for the entire time duration shown. Accordingly, a "watchdog" timer function of controller 140, as shown in curve 350, initiates a power turn-off function at time E, which is typically about 1 second after starting the powering of excitation coil 106 and starter circuit 106 at time C. Starter switch 136 is opened at time E, to turn off power to starter circuit 130; preferably at time E also, the power to r.f. power source 210, 220 is turned off by taking r.f. generator 120 out of circuit with variable d.c. supply 210, e.g., with a solenoid-actuated switch.

Figure 4:
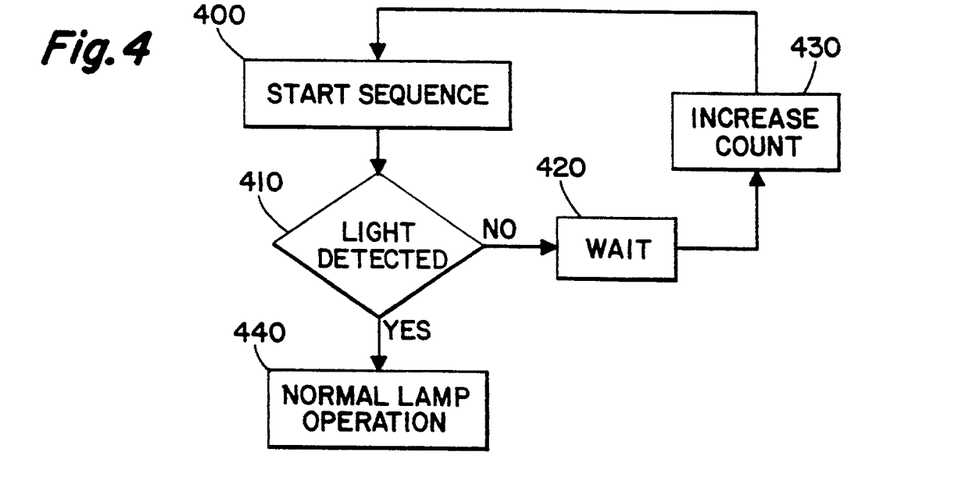
FIG. 4 is a logic-state diagram showing repetition of the starting-sequence waveforms of FIG. 3 to facilitate starting of a HID lamp.

If HID lamp 100 fails to start during the start-up sequence shown in FIG. 3B, controller 140 typically waits a predetermined period of time, such as 1 minute for the above-mentioned 300-watt lamp, and then re-initiates the start-up sequence. This procedure is illustrated in FIG. 4, wherein a start sequence, e.g. as shown in FIG. 3B or 3A, occurs in logic block 400. A logic block 410 queries whether steady state light output from HID lamp 100 has been detected. This is implemented in system controller 140 in response to light sensor 160. If steady state light output has not been detected, a logic wait state 420 is reached, wherein neither starter circuit 130 nor excitation coil 106 is powered. Typical values of a wait period are in excess of about 30 seconds, and preferably in excess of about 1 minute.

Providing such wait state 420 effects a significant solution to the problem of an HID lamp extinguishing after steady state operation. As mentioned above, such extinguishing may occur accidentally, for instance, if a lightning bolt, for instance, triggers a momentary disconnection of the lamp from its power supply circuit. An individual manually trying to re-start the lamp may try many times without success. The reason for this, as has been found, is that the lamp typically must thermally recover before it can be re-started, i.e. cool below a critical level that allows restarting to occur. For a 300-watt lamp, as mentioned, such thermal recovery period is typically on the order of 10 minutes, depending, however, upon the ambient thermal environment and construction of the lamp.

A wait at logic state 420 for only 1 minute, for instance, is typically less than the thermal recovery period of the lamp. Therefore, after increasing the count in logic state 430, start sequence 400 is re-initiated. If the thermal recovery period for the lamp is 10 minutes, then cycling through logic states 400-410-420-430 for ten or more times is usually required if, for instance, the wait in state 420 is 1 minute.

To prevent an indefinite cycling through the foregoing loop 400-410-420-430 where, for instance, the lamp is inoperable, system controller 140 overrides the loop and turns off power to the lamp and starter circuit. This is readily accomplished by turning off the power when the count at logic state 430 exceeds a preset limit.

If light is detected in logic state 410, logic state 440 is reached, corresponding to normal lamp operation.

Figure 5:
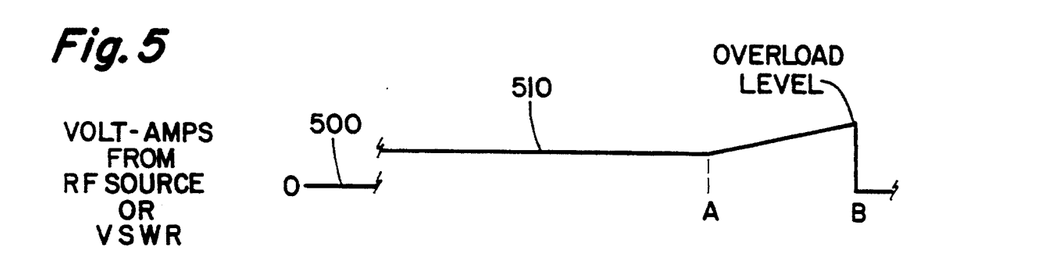
FIG. 5 shows timing waveforms for turning off the power to a lamp in the event of an overload condition.
Figure 6:
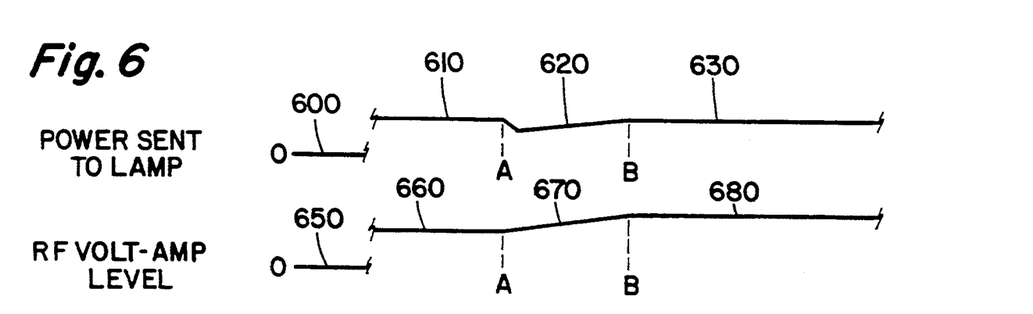
FIG. 6 shows timing waveforms for adjusting the volt-amps sent to a lamp to maintain a nearly constant power level in the lamp.

FIGS. 5 and 6 illustrate still further features that can be performed by system controller 140. FIG. 5 for instance, illustrates an overload-protection feature of system controller 140. Curve 500 of FIG. 5 schematically shows (i) the volt-amps sent from r.f. power source 210, 200 (FIG. 2) to the load (i.e. coil 106), or, alternatively, (ii) the voltage standing wave ratio (VSWR) of the power sent from r.f. power source 210, 220 to the load. The VSWR may be derived in known manner from a directional coupler (not shown) that may be used to implement volt-amp & power sensor 230 in known manner where connection 240 in FIG. 2 is a transmission line with known impedance, such as a 50-ohm coaxial cable. During steady state lamp operation shown at 510, a deviation in the mentioned volt-amps, or of VSWR, is shown commencing at time A, and continuing to through time B. At time B, system controller 140 determines that the level of the mentioned volt-amps, or, alternatively, of the mentioned VSWR, exceeds an overload level. Controller 140 can therefore take r.f. generator 220 out of circuit with variable d.c. supply 210, terminating the power sent to the lamp and protecting the lamp from possible overload damage.

FIG. 6 illustrates the feature of maintaining the power sent to the lamp to within a narrow range. In FIG. 6, curve 600 shows power sent to the lamp by r.f. power source 210, 220, with steady state power being shown at 610. At time A, power to the lamp begins to change, for example diminishing as shown. The change may be due, for instance, to aging factors such as outgassing of fill material from the lamp that alters its impedance, or drifting of the impedance-matching relation of impedance-matching circuit 250. In response, system controller 140 increases the volt-amps sent to the lamp by increasing the voltage output of variable d.c. supply 210. This is shown in curve 650 by the increase in volt-amps from a nearly constant level at 660 to an increasing level at 670. The increasing level of volt-amps continues until a nearly constant level is reached at time B, at 680, corresponding to a nearly constant level 630 of power sent to the lamp.

In this manner, system controller 140 maintains the power sent to the lamp at the sum of a constant reference level and a deviation from such constant level of typically less than about 3 percent.

IMPLEMENTATION

Additional details on implementing the auto-starting lamp system of the present invention are now described. Referring to FIG. 2, variable d.c. supply 210 may comprise a switch mode power supply, such as model number 28115BFPR sold by Qualidyne Systems Inc. of San Diego, Calif. It can be adapted in a routine manner to meet the system requirements set forth herein. Its output d.c. voltage level is easily controlled by system controller 140, since the desired output level may be set by an analog reference voltage.

R.f. generator 220 suitably comprises an r.f. generator with product number 92-A01, sold by Ehrhorn Technological Operations, Inc. of Colorado Springs, Colo. It can be adapted in a routine manner to meet the system requirements set forth herein.

Volt-amp &power sensor 230 may be implemented with a volt-amp sensor and a phase detector for sensing the phase between the volts and amps. As is known, power varies according to the mathematical relation of volt-amps multiplied by the cosine of the phase angle between the volts and amps. Where connection 240 in FIG. 2 is a transmission line with a known impedance, such as a 50-ohm coaxial cable, volt-amp & power sensor 230 may be conveniently implemented as a directional coupler, a device known in the art.

Impedance-matching network 250 may be implemented by the illustrated circuit of tunable capacitors 252, 254 and 256. Network 250, however, may be implemented by a wide variety of circuits as will be apparent to those skilled in the art.

System controller 140 may, if desired, use more than one internal d.c. logic supply voltage. For instance, 12 volts may power most logic supply circuits, while 24 volts powers solenoid-actuated starter switch 136. Such d.c. logic supply voltages are suitably implemented with standard linear voltage regulators (not shown). De-coupling filters (not shown) are preferably used with the foregoing linear voltage regulators to provide noise immunity against the high electric field gradients that exist in the vicinity, of the lamp before starting. Such field gradients may reach 3000 volts per meter.

Figure 7:
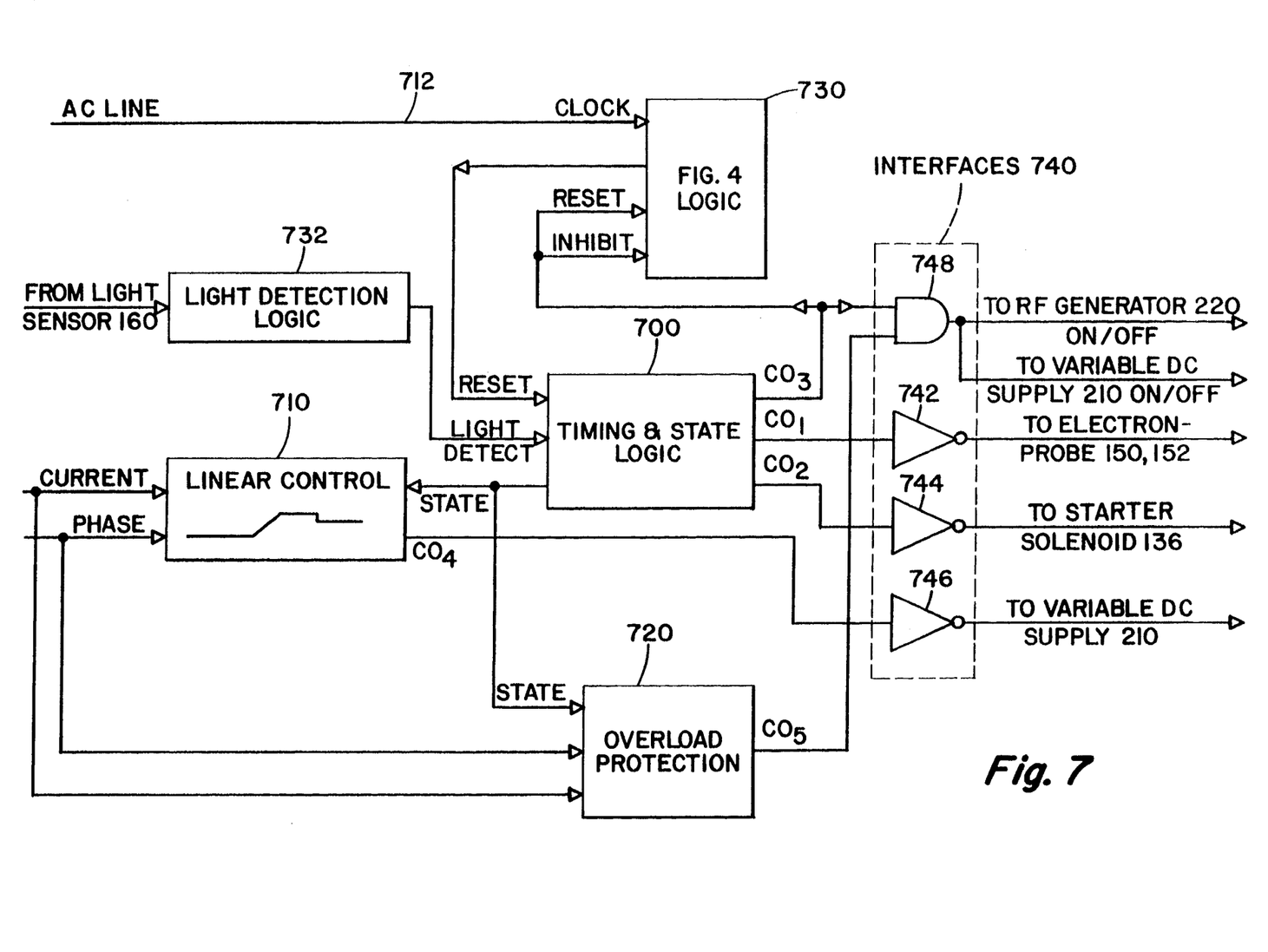
FIG. 7 is a block diagram of basic sections of a typical system controller that can be used in the system of FIGS. 1 and 2.

Implementing system controller 140's above-described functions, particularly those mentioned in connection with FIGS. 3A–3B and 4–6, will be further guided with reference to FIG. 7.

FIG. 7 is a block diagram of basic sections of a typical system controller that can implement system controller 140 of FIGS. 1 and 2. The basic timing-and-state cycles of system controller 140 described above are suitably implemented in block 700 with asynchronous diode-coupled logic circuitry (not shown) for simplicity and high noise immunity. The basic timing-and state cycles include, for instance, the electron-probe powering shown FIG. 3A (curve 310), via control output $CO_1$; engaging the solenoid-actuated starter switch shown in FIG. 3A (curve 320), via control output $CO_2$; initiating the power ramp and subsequent drop to a steady state power level shown in FIG. 3A (curve 340), or to 0 power in FIG. 3B (curve 340'), via a STATE signal; and the watchdog timer function shown in FIG. 3B (curve 350) that causes r.f. power source 210, 220 to be turned off, via control output $CO_3$.

A linear control block 710 provides an analog signal on a controller output $CO_4$, for controlling the voltage level of variable d.c. supply 210, and is responsive to the current and phase angle between volts and amps sent from r.f. generator 220 (FIG. 2) towards the lamp. The voltage level of variable d.c. supply 210 is controlled for the above-mentioned purposes, for instance, of generating power ramp 342 of curve 340 in FIG. 3A, or adjusting the volt-amps level in curve section 670 of curve 650 of FIG. 6. Implementing such functions will be routine to those of ordinary skill in the art; for instance, the ramp function can be implemented with a standard ramp generator (not shown) and the adjusting of the volt-amps level can be implemented with a standard differential amplifier (not shown) receiving a fixed reference signal on one input, and a dynamic signal indicating volt-amps on its other input.

Linear control block 710 is responsive, also, to a STATE signal generated by timing-and-state logic block 700. The STATE signal disables the power regulation function of linear control circuit 710 (see FIG. 6) during the start-up sequence of FIG. 3A resulting in a lamp start until time E; and during the start-up sequence of FIG. 3B resulting in non-start of a lamp, even after time E when power from r.f. power source 210, 220 is turned off. This is because power regulation is not desired during lamp start-up or when the lamp fails to start.

An overload protection block 720 implements the overload-protection feature of FIG. 5. As shown, block 720 may be responsive to the current and phase angle between volts and amps sent from r.f. generator 220 (FIG. 2) towards the lamp. When an overload condition of volt-amps supplied from r.f. power source 210, 220, or, alternatively, of the voltage standing wave ratio (VSWR) of power sent to the lamp, exists, block 720 produces a controller output $CO_5$ that turns off variable d.c. supply 210 and r.f. generator 220. The comparison logic for overload protection block 720 can be implemented with a standard differential amplifier (not shown) receiving a fixed overload reference signal on one input, and a dynamic signal indicating volt-amps, or VSWR, on its other input.

As with linear control block 710, overload protection block 720 is also responsive to the STATE signal generated by timing-and-state logic block 700. The STATE signal disables overload protection block 720 during start-up sequences until the lamp is operating normally. This prevents overload protection block 720 from turning off r.f. power source 210, 220 during lamp start up when the impedance relation between source and load is typically quite mismatched.

The following logic functions of above-described FIG. 4 are suitably implemented with logic block 730. If the lamp does not start during the first start-up sequence, control output $CO_3$ from timing-and-state logic block 700, which turns off r.f. power source 210, 220, also serves as a RESET and an INHIBIT signal for a counter (not shown) in logic block 730. The counter is suitably implemented with standard asynchronous timing circuitry. The wait period of logic wait state 420 in FIG. 4, occurring after a start sequence results in a non-start, is suitably implemented by an internal clock in logic block 730 (not shown); the internal clock, in turn, suitably derives its timing from an a.c. input line 712, marked "CLOCK," that supplies power to system controller 140. At the end of wait state 420 in FIG. 4, logic block 730 sends a PULSE signal to the RESET input of timing-and-state logic block 700, which then again initiates a lamp start-up sequence.

Once light is detected by a standard light detection logic block 732, for instance, a LIGHT DETECT signal is sent to timing-and-state logic block 700. Logic block 700 responsively, for instance, sends a STATE signal to linear control block 710 to instruct r.f. power source 210, 220 to make the change shown in curve 340 (FIG. 3A) of shifting from peak power level 344 to steady state power level 346. Light detection logic block 732 preferably uses standard logic circuitry (not shown) with hysteresis for noise immunity.

FIG. 7 also shows interfaces 740 which couple the control signals from system controller 140 to the other system circuitry shown in FIG. 2. Interfaces 740 preferably are arranged to be immune from generated noise mentioned above. Device drivers 742 and 744, which respectively couple control outputs $CO_1$ and $CO_2$ to their noted destinations, preferably each comprise an opto-isolator (not shown) coupled to a logic-driven MOSFET (not shown). The opto-coupler also facilitates coupling between a logic voltage in system controller 140 at one level (e.g. 12 volts) and a substantially different drive voltage (e.g. 24 volts for solenoid-actuated starter switch 136). Device driver 746, which couples the analog signal on control output $CO_3$ to variable d.c. supply 210, preferably comprises an operational amplifier, or other buffer (not shown), so as to provide an output at low impedance which is, thus, more immune to noise. An AND gate 748 may receive control outputs $CO_3$ and $CO_5$ and send a resultant signal to control the on/off condition of both r.f. generator 220 and variable d.c. supply 210.

From the foregoing, it will be appreciated that the present invention provides a system for automatically starting a high intensity discharge lamp of the type powered from an excitation coil proximate a main arc tube of the lamp. In a preferred embodiment, the auto-starting system is effective to re-start a lamp after its arc has been extinguished from steady state operation. The auto-starting system may further turn off power to the lamp if an overload condition is sensed. Additionally, the auto-starting system can regulate the power supplied to the lamp to be within a narrow range.

While the invention has been described with respect to specific embodiments by way of illustration, many modifications and changes will occur to those skilled in the art. It is, therefore, to be understood that the appended claims are intended to cover all such modifications and changes as fall within the true spirit and scope of the invention.

What is claimed is:

1. An auto-starting lamp system, comprising:
   (a) an electrodeless high intensity discharge lamp including:
      (i) an arc tube containing an ionizable fill;
      (ii) an excitation coil surrounding said arc tube for exciting a discharge in said ionizable fill at least during steady state lamp operation; and
      (iii) a starter circuit for facilitating discharge of said ionizable fill;
   (b) a controllable radio frequency power source for powering said lamp excitation coil;
   (c) an electrical network for matching the impedance of said excitation coil to the impedance of the radio frequency power source, said impedance-matching network providing a single impedance matched value present during both lamp start-up and steady state lamp operation;
   (d) control means for causing said radio frequency power source, during lamp start-up, to ramp up in power to a peak level in excess of a steady state lamp operating power level, and then to decrease from the peak level.

2. The auto-starting lamp system of claim 1, wherein the power ramp is continuous until the peak power level is reached.

3. The auto-starting system of claim 1, wherein the peak power level exceeds the steady state power level by more than about 40 percent.

4. The auto-starting lamp system of claim 1, wherein:
   (a) said lamp includes a gas probe for helping to initiate discharge of said lamp ionizable fill;
   (b) an electron-yielding circuit is included in said auto-starting lamp system for charging said gas probe with free electrons prior to powering said starter circuit; and
   (c) wherein a time delay occurs between removal of said free electrons and beginning of said radio frequency power source to such ramp-up in power.

5. The auto-starting lamp system of claim 4, wherein said electron-yielding circuit includes an electron-yielding conductor placed in the proximity of said gas probe, and a circuit for supplying voltage in excess of about 5 kilovolts to said electron-yielding conductor.

6. The auto-starting lamp system of claim 5, wherein said high voltage-supplying circuit includes means to supply a pulsed-and-damped a.c. voltage to said electron-yielding conductor.

7. The auto-starting lamp system of claim 1, further comprising means for turning off power to said starter circuit if said lamp ionizable fill has failed to reach arc discharge within a first predetermined period of time.

8. The auto-starting lamp system of claim 7, wherein said means for turning off power comprises:
   (a) an optical detector for detecting whether said lamp ionizable fill has reached steady state discharge;
   (b) a timing circuit for measuring the time elapsed since powering said starter circuit; and
   (c) a circuit, responsive to said timing circuit, for turning off power to said starter circuit after the first predetermined period of time has elapsed.

9. The auto-starting lamp system of claim 8, wherein said circuit for turning off power further includes means, responsive to said timing circuit, for also turning off power to said radio frequency power source after the first predetermined period of time has elapsed.

10. The auto-starting lamp system of claim 8, wherein said circuit for turning off power includes a controllable switch for disconnecting said starter circuit from a source of power when turning off power to said starting circuit is desired.

11. The auto-starting lamp system of claim 7, further comprising means for re-powering said starter circuit after a second predetermined period of time has elapsed.

12. The auto-starting system of claim 11, wherein the second predetermined period is sufficiently long as to prevent thermal damage to said lamp resulting from powering said starter circuit.

13. The auto-starting lamp system of claim 11, wherein said re-powering means comprises:
   (a) a timing circuit for measuring the elapsed time since power to said starter circuit is turned off; and
   (b) control means, responsive to said timing circuit, for initiating re-powering of said starter circuit.

14. The auto-starting lamp system of claim 11, further comprising control means for alternately turning on and turning off power to said starter circuit a plurality of times.

15. The auto-starting system of claim 14, wherein said control means for alternately turning on and turning off power includes means to alternately turn on and turn off power after said lamp ionizable fill recovers an ability to reach full discharge after being extinguished.

16. The auto-starting system of claim 1, further comprising an overload shut-down means for turning off power to said lamp excitation coil if at least one of an overload condition of a volt-amperes and a voltage standing wave ratio of power supplied from said radio frequency power source exceeds a predetermined overload level.

17. The auto-starting system of claim 1, further comprising power-adjusting means for adjusting the level of volt-amperes sent from said radio frequency power source to said lamp excitation coil so as to maintain a relatively steady level of power in said coil.

18. The auto-starting system of claim 17, wherein said relatively steady level of power in said lamp excitation coil comprises the sum of a constant reference level and a deviation from said constant level of less than about 3 percent.

19. The auto-starting system of claim 17, wherein said volt-ampere adjusting means comprises:
   (a) a volt-ampere sensor for sensing the volt-amperes sent from said r.f. power source to said lamp excitation coil; and
   (b) control means, responsive to said volt-ampere sensor, for adjusting the level of volt-amperes sent from said radio frequency power source to said lamp excitation coil to maintain a relatively steady level of power in said coil.

20. An auto-starting lamp system, comprising:
   (a) an electrodeless high intensity discharge lamp including:
      (i) an arc tube containing an ionizable fill;
      (ii) an excitation coil surrounding said arc tube for exciting a discharge in said ionizable fill at least during steady state lamp operation; and
      (iii) a starter circuit for facilitating discharge of said ionizable fill;
   (b) a controllable radio frequency power source for powering said lamp excitation coil;
   (c) an electrical network for matching the impedance of said excitation coil to the impedance of the radio frequency power source, said impedance-matching network providing a single impedance matched value during both lamp start-up and steady state lamp operation;
   (d) control means for causing said radio frequency power source, during lamp start-up, to ramp up in power to a peak level substantially in excess of a steady state lamp operating power level, and then to decrease from the peak level;
   (e) means for turning off power to said starter circuit if said lamp ionizable fill has failed to reach discharge within a first predetermined period of time;
   (f) wherein said lamp includes a gas probe for helping to initiate discharge of said lamp ionizable fill, said gas probe being charged with free electrons by an electron yielding circuit prior to powering of said starter circuit; and
   (g) wherein a time delay occurs between removal of said free electrons to said gas probe and beginning of said radio frequency power source to such ramp up in power.

21. The auto-starting lamp system of claim 20, further comprising control means for alternately turning on and turning off power to said starter circuit after said lamp ionizable fill recovers an ability to reach full discharge after being extinguished.

22. The auto-starting lamp system of claim 20, further comprising means for re-powering said starter circuit after a second predetermined period of time has elapsed, said second predetermined period of time being sufficiently long as to prevent thermal damage to said lamp resulting from powering said starter circuit.

23. The auto-starting lamp system of claim 22, further comprising control means for alternately turning on and turning off power to said starter circuit after said lamp ionizable fill recovers an ability to reach full discharge after being extinguished.

* * * * *